(12) United States Patent
Williams

(10) Patent No.: US 6,336,641 B1
(45) Date of Patent: Jan. 8, 2002

(54) BREAK-AWAY MUZZLE CAP RETENTION MECHANISM

(75) Inventor: Michael W. Williams, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/562,995

(22) Filed: May 1, 2000

(51) Int. Cl.$^7$ ................................................ F16J 15/02
(52) U.S. Cl. ...................................................... 277/637
(58) Field of Search .................................. 277/630, 637, 277/640, 641, 616

(56) References Cited

U.S. PATENT DOCUMENTS 5,080,787 A * 1/1992 Brown et al.
5,294,209 A * 3/1994 Naka et al.
5,437,133 A * 8/1995 Pliml

* cited by examiner

Primary Examiner—Robert J. Sandy
Assistant Examiner—Karlena D. Schwing
(74) Attorney, Agent, or Firm—Michael J. McGowan; James M. Kasischke; Prithvi C. Lall

(57) ABSTRACT

A break-away end cap assembly includes a tube member of predetermined characteristics and an end cap member for releasably securing the open end of the tube member. An annular recessed groove is formed in the inner surface of the tube member. The end cap member includes an outer flange portion having an outer peripheral surface consistent in diameter with an outer diameter of the tube member and a body portion depending from the outer flange portion. At least one recessed opening is laterally formed within the body portion with a pilot hole formed at the base end of each recessed opening. A normally biased spring member is seated in a base of the recessed opening and a retractable pin is positioned over the normally biased spring member. The retractable pin has an outer beveled surface end which seats within the annular recessed groove and is held therein with the normally biased pressure of the spring member until a force greater than the normal bias of the spring member is applied against the inner surface of the end cap.

18 Claims, 3 Drawing Sheets

BREAK-AWAY MUZZLE CAP RETENTION MECHANISM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a break-away muzzle cap retention mechanism. More particularly, the invention relates to a break-away muzzle cap retention mechanism which utilizes retractable pins in place of shear pins.

(2) Description of the Prior Art

The current art for break-away muzzle cap retention mechanisms are varied. Certain United States Navy Submarine countermeasures are housed in launch tubes external to a pressure hull where an external surface of the tubes are subjected to depth pressure. An internal part of the tube, where the countermeasure is housed, is maintained dry and at one atmosphere. The muzzle cap is designed to both seal the internal environment of the tube from water, and to release when the internal pressure reaches a predetermined amount. When a command is given for launch, a gas generating device is ignited and pressure quickly increases in the tube until the pressure is great enough to overcome the shear strength of shear pins holding the current muzzle cap in place and depth pressure acting on a face of the muzzle cap. The manufacture of the current shear pins, as well as the installation of the pins, is prohibitively expensive, and necessitates the drilling of holes through the launch tube wall. It is desirable for future launch tubes to be reusable and less expensive, thus a new muzzle cap retention mechanism was needed to both decrease costs, and to avoid the drilling of holes through the launch tube wall, especially if the tube is made of a wound glass fiber composite material instead of the current more commonly used steel material.

Thus, a problem exists in the art whereby a consistently operable and inexpensive mechanism for a break-away muzzle cap is not known.

The following patents, for example, disclose various types of locking mechanisms, but do not disclose a consistently operable a break-away muzzle cap retention mechanism utilizing a retractable pin mechanism.

U.S. Pat. No. 4,637,914 to Boyle et al.;
U.S. Pat. No. 4,743,097 to Bloch;
U.S. Pat. No. 4,988,248 to Flux;
U.S. Pat. No. 5,062,826 to Mantovani et al.;
U.S. Pat. No. 5,180,208 to Lawandi;
U.S. Pat. No. 5,294,209 to Naka et al.;
U.S. Pat. No. 5,658,087 to Butkovich et al.;
U.S. Pat. No. 5,667,330 to Henkel et al.;
U.S. Pat. No. 5,785,448 to Courgeon et al.; and
U.S. Pat. No. 5,779,385 to Fechter.

Specifically, the patent to Boyle et al. discloses a quick release guide sleeve assembly including an outer sleeve, an inner sleeve axially slidably received in the outer sleeve and having first and second axial positions with respect to the outer sleeve; and a locking mechanism movably mounted on the outer sleeve for frictionally engaging wall surfaces defining an opening for receiving the outer sleeve. The locking mechanism is a locking ball 5, radially movable within a nesting port 4 and has a locking position in which at least part of the locking mechanism projects radially outwardly beyond the external circumferential surface of the outer sleeve. The locking mechanism further has a releasing position in which the locking mechanism is in a radially inwardly withdrawn state relative to the circumferential surface of the outer sleeve. The assembly further includes a camming arrangement carried on the inner sleeve for pressing the locking mechanism into the locking position when the inner sleeve is in the first axial position and for allowing the locking mechanism to assume the releasing position when the inner sleeve is in the second axial position. A spring urges the inner sleeve continuously into the first axial position.

The patent to Bloch discloses a clamping device for securing an object within an aperture of a ring member utilizing a shape memory alloy material. The shape memory alloy material contracts when heated and operates to bias pin members inwardly within a central opening of the ring to thereby secure an object such as a canister placed therein. The shape memory alloy material may be in the form of a strap or wire which is easily heated and provides for a fast clamping and release action of the clamping device.

Flux discloses a plug-in connector device having a ring-like head portion and a hollow shank. The shank has locking balls which can be held to project outwardly of the shank in a locked condition of the device, and can also move to a retracted position under the control of an axially slidable probe, the movement of which is controlled by an actuator lever on the head portion which can only be moved to release the locking balls from their locked condition on a separate manipulation of a second lever, or in other embodiments a safety catch button, also mounted on the head portion.

Mantovani et al. disclose a device for locking the base of a blood centrifugation cell on a retractable generally disc shaped chuck plate. The chuck plate encloses a plurality of elastic locators which extend radially a slight distance from the periphery of the plate. The plate further encloses a plurality of locking means which are biased to remain within the dimensions of the plate at rest and which are radially extendable by centrifugal force to extend beyond the periphery of the plate. An annular locking ring engages the base of the cell and extends around the periphery of the chuck plate. The locking ring has a plurality of internal recesses for initially receiving the elastic locators, and the locking means during centrifugation to secure the cell to the chuck plate.

Lawandi discloses a knockdown furniture, such as a chair, having a series of elongated tubular members adapted to be interconnected with quick release automatically locking coupling to form a frame of the furniture. A canvas panel having end sleeves can be mounted to the frame to provide a support surface, such as a seat panel, of the furniture. Pockets are provided on one side of the support panel, such as the underside of the seat panel, in order to receive the individual tubular members when the furniture is disassembled. A zipper which is provided at opposed end edges of the support panel is used to form a sleeve therewith which contains the pockets and thus the tubular members, thereby resulting in a compact storage of the dismantled furniture.

Naka et al. discloses an attaching device for attaching a tool to a tool manipulation arm and having a first attachment member affixed to the tool manipulation arm which is adapted to engage a second attachment member affixed to the tool. The first attachment member includes a locking device which is engageable with a cam surface formed on the second attachment member such that the engagement urges a seating surface defined on the first attachment member and a mounting surface defined on the second attachment member into sealing contact with each other. The seal effected by the contact of these surfaces hermetically seals the locking device such that it is not susceptible to contamination by the dust water, sand, ships, oil, etc, which may be present in the working environment in which the robot is located.

The patent to Butkovich et al. discloses a locking mechanism in the form of locking balls for releasably fixing an externally splined power take-off shaft to an output shaft of off-highway equipment such as a tractor. The output shaft has a hollow, integrally splined hub portion adapted to axially receive the externally splined power take-off shaft to prevent relative rotational movement between the power take-off and output shafts. The locking mechanism includes a locking member supported within a radial opening in the power take-off shaft so as to be radially moveable between an outer locking position and an inner unlocking position. In the outer locking position, the locking member is engageable with a recess formed in the hub portion of the output shaft to prevent relative axial movement between the power take-off shaft and the output shaft. In the inner unlocking position, the locking member is disengaged from the recess in the output shaft to permit such relative axial movements. An elongated actuator is positioned within an inner bore of the power take-off shaft and has a cam surface thereon. The actuator is movable between a first position in which the actuator operably maintains the locking member in its locking position, and a second position which permits radial movement of said locking member to its unlocking position. Upon return of the actuator to the first position, the cam surface operably engages the locking member to move the locking member to its locked position.

Henkel et al. discloses a locking mechanism in the form of a locking detent or ball for releasably fixing an externally splined power take-off shaft to an output shaft for off-highway equipment such as a tractor. The output shaft has a hollow, internally spined hub portion adapted to axially receive the externally splined power take-off shaft to prevent relative rotational movement between the power take-off and output shafts. The locking mechanism includes a locking member guided within a radial opening on the output shaft so as to be radially movable between an inner locking position and a outer unlocking position. In the inner locking position the locking member is engageable with a recess formed on the power take-off shaft to prevent relative axial movement between the power take-off shaft and the output shaft. In the outer unlocking position, the locking member is disengaged from the recess in the output shaft to permit such relative axial movement. An actuator is positioned about an exterior of the output shaft and is movable between a first position in which the actuator operably maintains the locking member in its locking position, and a second position which permits radial movement of the locking member to its unlocking position.

Courgeon et al. discloses a device for coupling two shafts adapted to turn about a common axis and includes a rotational coupling system associated with an axial retaining system. The rotational coupling system includes conjugate profiles at the ends of the shafts. The axial retaining system comprises a two-part sleeve coupled axially to the shaft and cooperating with a spring disposed inside the sleeve. The end of each shaft is surrounded by the sleeve. The spring operates after releasing an arming system including studs on the sleeve cooperating with cams at the end of one of the shafts.

The patent to Fechter discloses a coupling for axially fixing a hub on a shaft and has locking members slidable in slots of the hub and which are engaged in recesses in the shaft by a collar which holds the locking members in the recesses so as to fix the hub axially on the shaft. In a released position, a shoulder on the collar catches behind a ledge formed on the hub but only when the shaft is removed from the hub. When the shaft is in the hub, it cams against unlocking members in the form of balls which prevent the collar from being tilted so as to engage the collar shoulder with the ledge on the hub. One embodiment for a later application has a collar biasing spring radially inside of the collar and axially between the locking members and the shaft entry end of the hub. An embodiment for a smaller application has the spring radially outside of the hub and on the opposite axial side of the locking elements. A shield is provided in this embodiment to enclose the spring chamber.

It should be understood that the present invention would in fact enhance the functionality of the above patents by providing a break-away muzzle cap retention mechanism as in the present invention having a retractable pin mechanism which is both effective and cost-efficient.

SUMMARY OF THE INVENTION

Therefore it is an object of this invention to provide a break-away muzzle cap retention mechanism.

Another object of this invention is to provide a break-away muzzle cap retention mechanism that releasably secures a muzzle cap to a launch tube.

Still another object of this invention is to provide a break-away muzzle cap retention mechanism that releasably secures the muzzle cap to the launch tube with retractable pins.

A still further object of the invention is to provide a break-away muzzle cap retention mechanism for releasably securing the muzzle cap to the launch tube with reusable retractable pins.

Yet another object of this invention is to provide a break-away muzzle cap retention mechanism which is simple to manufacture and easy to use.

In accordance with one aspect of this invention, there is provided a break-away end cap for a closed tube which includes a tube member of predetermined characteristics and an end cap member for releasably securing the open end of the tube member. An annular recessed groove is formed in the inner surface of the tube member. The end cap member includes an outer flange portion having an outer peripheral surface consistent in diameter with an outer diameter of the tube member and a body portion depending from the outer flange portion. At least one recessed opening is laterally formed within the body portion with a pilot hole formed at the base end of each recessed opening. A normally biased spring member is seated in a base of the recessed opening and a retractable pin is positioned over the normally biased spring member. The retractable pin has an outer beveled surface end which seats within the annular recessed groove and is held therein with the normally biased pressure of the spring member until a force greater than the normal bias of the spring member is applied against the inner surface of the end cap.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a break-away muzzle cap retention mechanism used to secure break-away muzzle caps on submarine countermeasure launch tubes before the countermeasures are launched. The mechanism can also be used with muzzle caps on surface vessel torpedo tubes, or any tube that requires an end to break-away at a prescribed internal pressure.

Figure 1:
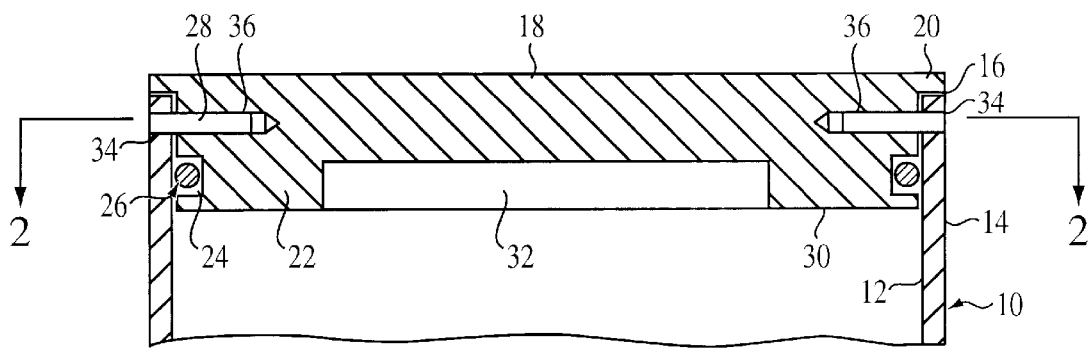
FIG. 1 is a side sectional view of a prior art connection for a muzzle end cap.
Figure 2:
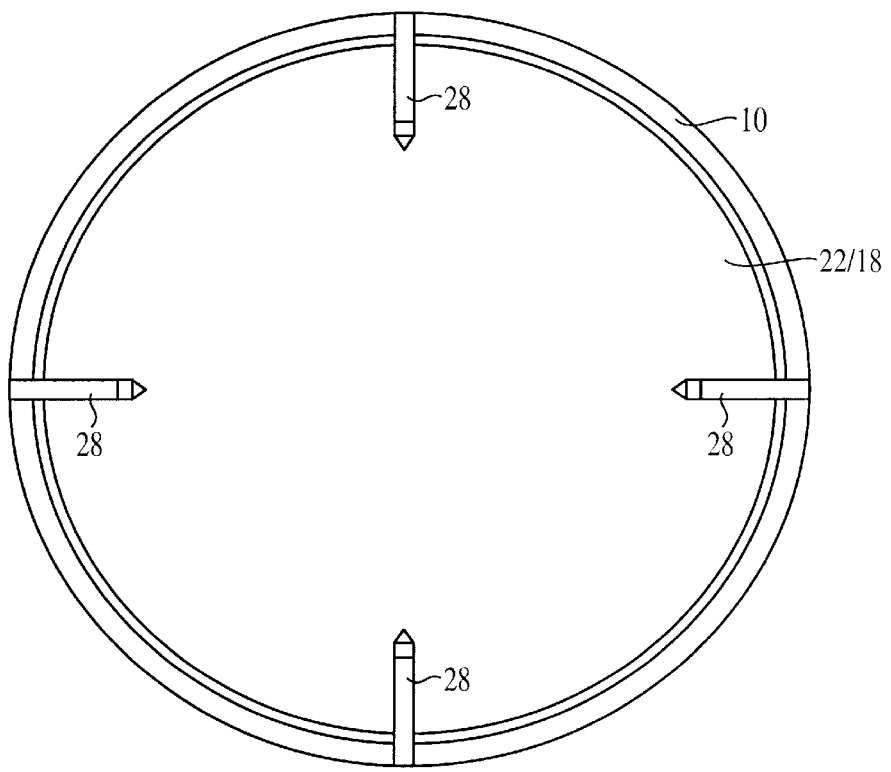
FIG. 2 is a top plan view of a prior art connection for a muzzle end cap taken along line 2—2 of FIG. 1.

Referring first to the subject matter of FIGS. 1 and 2, there is shown a sectional view and top plan view, respectively, of a prior art end cap connection.

In particular, the prior art end cap connection includes a launch tube 10 of a substantially cylindrical shape and having an inner peripheral surface 12 and an outer peripheral surface 14. The launch tube 10 is further defined by an open end 16 from which a missile (not shown) is launched.

An end cap 18 is seated within the open end 16 of the launch tube 10 for selectively sealing the launch tube 10. The end cap 18 includes an outer flange member 20 defining an outer surface of the end cap 18 and a body portion 22 depending from the flange member 20. The depending body portion 22 terminates in an internal face 30 of the end cap 18. The internal face 30 of the end cap includes a cut out portion 32 of a substantially cylindrical shape as shown. Each of the outer flange member 20 and depending body portion 22 are cylindrical in their outer circumference and a diameter of the body portion 22 is less than a diameter of the outer flange member 20. The diameter of the depending body portion 22 is such that an outer peripheral surface thereof corresponds to a diameter of an inner peripheral surface 12 of the launch tube 10.

The depending body portion 22 of the end cap 18 includes an outer circumferential groove 24 formed therearound. The outer circumferential groove 24 is formed adjacent the distal or internal face 30 of the end cap 18. An O-ring 26 is seated within the outer circumferential groove 24 and assists in the friction fit of the depending body portion 22 against the inner peripheral surface of the launch tube 12. The end cap 10 is physically secured to the launch tube 10 by at least a pair of shear pins 28. The shear pins 28 are inserted through the launch tube 10 and into the end cap 18 via preformed openings 34 and 36 of the launch tube 10 and end cap 18, respectively.

Thus FIGS. 1 and 2 reflect the current muzzle cap 18 to launch tube 10 interface and connection by means of shear pins 28. Water tight sealing is achieved through the O-ring 26. The shear pins 28 are press fit into the close tolerance holes 34, 36 drilled through the launch tube 10 and into the muzzle cap 18 previously assembled to the launch tube 10. When the internal tube pressure increases during the launch transient of a missile or the like (not shown), the force acting on the internal face 30 of the muzzle cap 18 increases until there is enough force to shear the pins 28 and overcome any hydrostatic pressure due to the depth of launch for the muzzle cap 18 to break-away from the launch tube 10.

Figure 3:
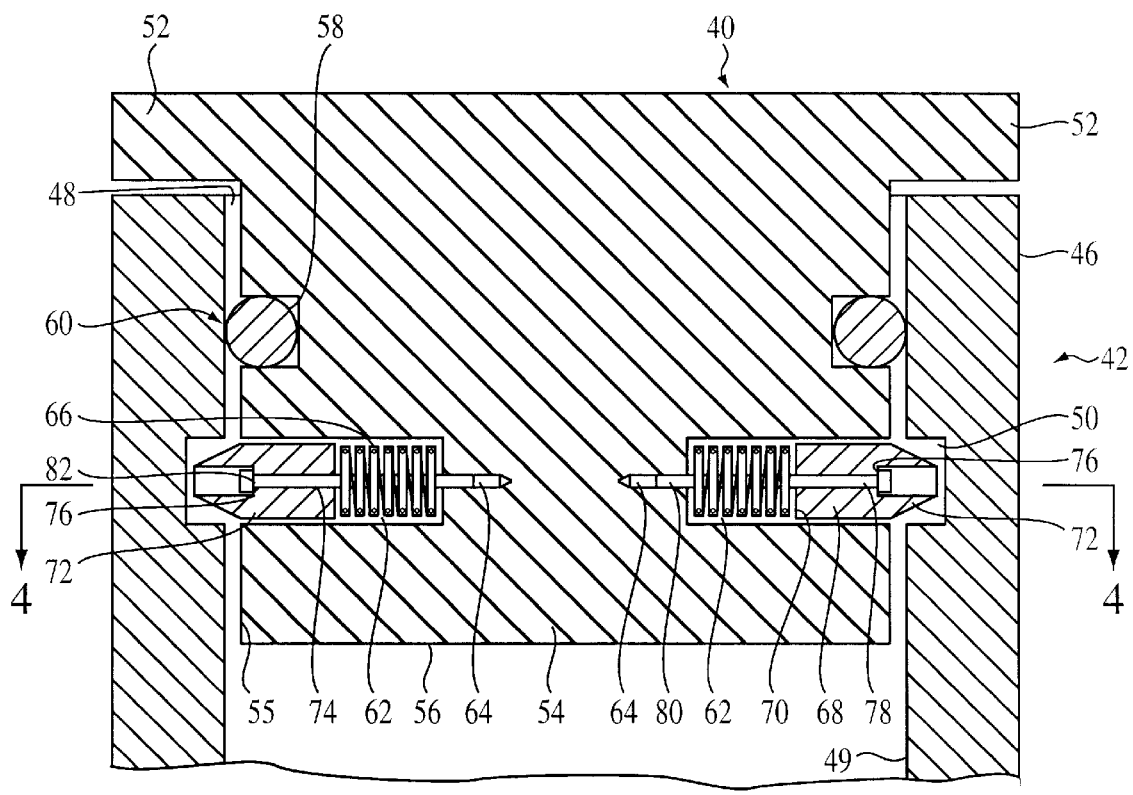
FIG. 3 is a side sectional view of a preferred embodiment of a connection for an end cap according to the present invention.
Figure 4:
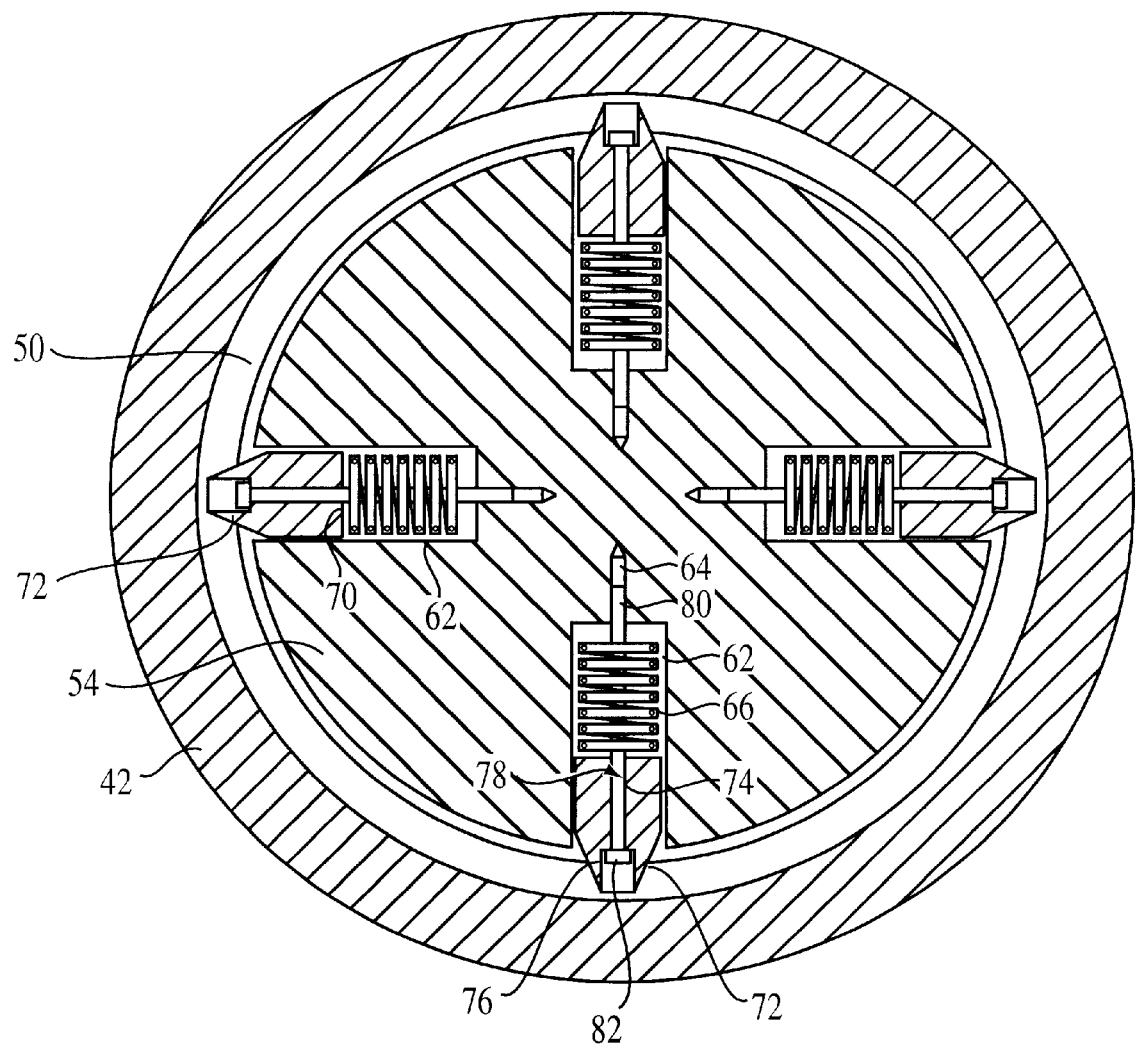
FIG. 4 is a top plan view of a connection for an end cap according to the present invention taken along line 4—4 of FIG. 3.

Turning now to the subject matter of the present invention as shown in FIGS. 3 and 4, there is shown an inventive muzzle cap 40 for use with a corresponding launch tube 42.

The launch tube 42 of the present invention includes a substantially cylindrical housing having an inner peripheral surface 49, an outer peripheral surface 46, and an open end 48. A significant difference exists in the present invention, however, in the provision of an annular recessed groove 50 on the inner peripheral surface 49 of the launch tube 42. Functioning of the annular recessed groove 50 will be described in further detail in connection with the muzzle cap 40 in the following.

The muzzle cap or end cap 40 is seated within the open end 48 of the launch tube 40 for selectively sealing the launch tube 42. The muzzle cap 40 includes an outer flange member 52 defining an outer surface of the muzzle cap 40 and a body portion 54 depending from the flange member 52. The depending body portion 54 terminates in an internal face 56 of the muzzle cap 40. The internal face 56 of the muzzle cap 40 is planar as shown. Each of the outer flange member 52 and depending body portion 54 are cylindrical in their outer circumference and a diameter of the body portion 54 is less than a diameter of the outer flange member 52. The diameter of the depending body portion 54 is such that an outer peripheral surface thereof corresponds to a diameter of the inner peripheral surface 49 of the launch tube 42.

The depending body portion 54 of the muzzle cap 40 includes an outer circumferential groove 58 formed therearound. The outer circumferential groove 58 is formed adjacent the outer flange portion 52 of the end cap 40. An O-ring 60 is seated within the outer circumferential groove 58 and assists in the friction fit of the depending body portion 54 against the inner peripheral surface 49 of the launch tube 42.

A further inventive feature is found in the securement of the muzzle cap 40 to the launch tube 42. In particular, the body portion 54 of the muzzle cap 40 includes at least one recessed opening 62 formed transverse, and preferably perpendicular, to outer peripheral wall surface 55 of the body portion 54. Even further, within the recessed opening 62, there is drilled a threaded or planar pilot hole 64 which is positioned substantially centrally longitudinally of the recessed opening 62. The pilot hole 64 extends into the body portion 54 of the muzzle cap 40 a greater distance than the recessed opening 62.

A normally biased spring member 66 is seated within the recessed opening 62 of the muzzle cap 40, and retractable pin 68 is positioned over the spring member 66 so as to extend beyond the outer peripheral wall surface 55 of the body portion 54.

The spring member 66 is shown as being a coiled type spring, however, it should be understood that the shape of the spring is not intended to be limiting of the invention.

The retractable pin 68 includes a base end 70 in surface contact with the spring member 66 and an outer chamfered or beveled end 72 opposing the base end 70. The beveled end 72 is formed so as to be a substantially conical bevel, however, it is understood that modifications of the bevel shown may be suitable for the intended purpose and function of the invention. The retractable pin 68 further includes a longitudinal opening 74 formed therethrough in alignment with an opening in the spring member 66. The longitudinal opening 74 is stepped at 76 adjacent the outer end and within the conical shape thereof for limiting insertion of a retaining member 78.

The retaining member 78 is a threaded screw, anchor nail, or the like, which is inserted into the longitudinal opening 74 of the retractable pin 68 and through the spring to a point of anchoring within the pilot hole 64 of the body portion 54. The retaining member 78 includes an anchoring end 80 which may be provided with screw threads or smooth as necessary for operation of the device, and a head end 82 which seats against the stepped portion 76 of the longitudinal opening 74.

Thus, the launch tube 42 is connected with the muzzle cap 40 by way of the retractable pins 68 in contact with the springs 66. The retractable pins 68 are held in place during the assembly process by the recessed anchoring member 78. A water tight seal is provided by the O-ring 60.

A tool may be used to force the muzzle cap 40 onto the launch tube 42 by applying a force to the external face or outer flange portion 52 of the muzzle cap 40. The beveled edge 72 on the retracting pins 68 will contact the launch tube 42, causing a force on the pins 68 such that a compressive load is applied to the underlying springs 66. The beveled edge 72 extends around the circumference of the retractable pin 68 in order to allow for the beveled edge 72 to engage a surface in any rotational orientation. When the retractable pins 68 and springs 66 are recessed such that the total diameter of the muzzle cap 40 is less than the internal diameter of the launch tube 42, the muzzle cap 40 is free to move further in to the launch tube 42. When the muzzle cap 40 moves into the launch tube 42 such that the retractable pins 68 are in line with the annular recessed groove 50 in the launch tube 42, the load on the springs 66 will decrease, causing the springs 66 to expand and to push the retractable pins 68 into the annular recessed groove 50, effectively locking the muzzle cap 40 into the launch tube 42.

Upon an increase of internal tube pressure during a launch transient, the force acting on the internal face 56 of the muzzle cap 40 increases to overcome any hydrostatic pressure due to the depth of launch and forces the beveled edge 72 of the retractable pins 68 against the edge of the annular recessed groove 50 in the launch tube 42. The force on the beveled edge 72 causes the retractable pin 68 to apply a load to the springs 66, causing the springs 66 to contract and thus lower the retractable pin 68. Once the retractable pins 68 retract such that the total diameter of the muzzle cap 40 is less than the inner diameter 49 of the launch tube 42, and hydrostatic pressure is overcome, the muzzle cap 40 breaks away from the launch tube 42. The springs 66 are sized in such a way that the muzzle cap 40 will break-away at a predetermined internal pressure of the launch tube 42 relative to the hydrostatic pressure on the muzzle cap.

The present invention will significantly decrease overall manufacturing costs, and will negate the need to bore a hole in the launch tube, thus allowing for less expensive composite launch tube use.

The present invention may be used in any application that requires a part to break-away when there is a differential pressure applied across the part. One immediate use could be on surface vessel torpedo tubes, which utilize a muzzle cap much like the submarine countermeasure launch tube's muzzle cap for which the present invention was intended.

Finally, it is anticipated that the invention herein will have far reaching applications other than those of underwater vehicles.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A break-away end cap and tube assembly comprising:
   a tube member having an open end, and an inner tube surface having a recessed region formed therein;
   an end cap for securing the open end of said tube member, said end cap having an outer flange portion with an outer peripheral surface consistent in diameter with an outer diameter of said tube member, a body portion depending from said outer flange portion, said body portion having an inner face and a diameter less than a diameter of said outer flange portion, at least one recessed opening formed within said body portion, each of said at least one recessed opening having an inner end and an outer open end, and a pilot hole formed at the base end of each of said at least one recessed opening, said pilot hole being aligned with a longitudinal axis of said recessed opening and extending into said body portion;
   a normally biased spring member seated in said recessed opening of said end cap body portion;
   a retractable pin positioned radially outward of said normally biased spring member within said body portion recessed opening, said retractable pin including a base end in surface contact with said spring member, an outer end having a beveled surface, and a longitudinal opening formed through said retractable pin, the longitudinal opening including a stepped portion adjacent the outer end; and
   an anchoring member insertable into said longitudinal opening of said retractable pin and through said spring member, said anchoring member including an anchoring end fastenable within said body portion pilot hole and a head end seating on the stepped portion of said retractable pin longitudinal opening;
   wherein the beveled portion of said retractable pin seats within said recessed region and is held therein with the normally biased pressure of said spring member.

2. The assembly according to claim 1 wherein said tube member recessed region comprises an annular recessed groove.

3. The assembly according to claim 2 wherein said annular recessed groove is formed adjacent the open end of said tube member.

4. The assembly according to claim 1 further comprising an outer annular groove formed in an outer peripheral surface of said body portion and an O-ring fit within said outer annular groove.

5. The assembly according to claim 4 wherein the outer annular groove of said body portion is positioned between said at least one recessed opening and said flange portion of said end cap.

6. The assembly according to claim 1 wherein said at least one recessed opening is a plurality of recessed openings formed within said body portion.

7. The assembly according to claim 6 wherein each of said plurality of recessed openings are formed equidistant from the inner face of said body portion.

8. The assembly according to claim 7 wherein said tube member recessed region comprises an annular recessed groove.

9. The assembly according to claim 8 wherein said annular recessed groove is formed adjacent the open end of said tube member.

10. The assembly according to claim 1 wherein said pilot hole is threaded.

11. The assembly according to claim 10 wherein said anchoring member is threaded at the anchoring end thereof.

12. The assembly according to claim 11 wherein said spring is a helical spring.

13. The assembly according to claim 1 wherein said spring is a helical spring.

14. A break-away end cap and tube assembly comprising:
- a tube member having an open end, and an inner tube surface having a recessed region formed therein;
- an end cap for securing the open end of said tube member, said end cap having an outer flange portion with an outer peripheral surface consistent in diameter with an outer diameter of said tube member, a body portion depending from said outer flange portion, said body portion having an inner face and a diameter less than a diameter of said outer flange portion, and at least one recessed opening formed within said body portion, each of said at least one recessed opening having an inner end and an outer open end;
- a normally biased spring member seated in said recessed opening of said end cap body portion;
- a retractable pin positioned radially outward of said normally biased spring member within said body portion recessed opening, said retractable pin including a base end in surface contact with said spring member, and an outer end having a beveled surface; and
- a retaining means joined between said retractable pin and said body portions within said recessed opening, said retaining means retaining said retractable pin within said recessed opening while allowing movement of said retractable pin within said recessed opening and said spring being trapped within said recessed opening by said retractable pin;
- wherein the beveled portion of said retractable pin seats within said recessed region and is held therein with the normally biased pressure of said spring member.

15. The assembly of claim 14 wherein:
- said end cap has a pilot hole formed at the base end of each of said at least one recessed openings, said pilot hole being aligned with a longitudinal axis of said recessed opening and extending into said body portion;
- said retractable pin has a longitudinal opening formed therethrough, the longitudinal opening including a stepped portion adjacent the radially outer end of said longitudinal opening; and
- said retaining means comprising an anchoring member insertable into said longitudinal opening of said retractable pin and through said spring member, said anchoring member including an anchoring end fastenable within said body portion pilot hole and a head end seating on the stepped portion of said retractable pin longitudinal opening.

16. The assembly according to claim 15 wherein said pilot hole is threaded.

17. The assembly according to claim 16 wherein said anchoring member is threaded at the anchoring end thereof.

18. The assembly according to claim 17 wherein said spring is a helical spring.

* * * * *